Patented Mar. 5, 1935

1,993,532

UNITED STATES PATENT OFFICE 1,993,532

ASPHALT AND PROCESS OF PREPARING SAME

Felix J. Skowronski, Chicago, Ill., assignor to Universal Oil Products Company, Chicago, Ill., a corporation of South Dakota No Drawing. Application August 25, 1930, Serial No. 477,801

4 Claims. (Cl. 196—74)

The invention relates to asphalts and to the process of preparing the same, and pertains more particularly to the utilization of the asphaltic material produced during the conversion of hydrocarbon oils under cracking conditions.

In the treatment of hydrocarbon oils in which the oils are subjected to cracking conditions with the production of vapors and unvaporized residue, it is a customary practice to subject the unvaporized residue to a flash distillation to obtain additional light hydrocarbon products. During this flash distillation a heavy residuum is formed which is asphaltic in character, where the conditions under which the flash distillation is carried on are properly regulated to effect the formation of such residue. The control of the temperature of the oil entering the flashing still, and the introduction of outside gases and vapors must be regulated to the degree that the residue formed during the flash distillation is tarry or asphaltic. Such asphaltic product, while useful for many purposes to which commercial asphalt is applicable, possesses a low order of ductility and becomes quite brittle when exposed to cold climatic conditions.

It has been found, in accordance with the invention herein described, that the characteristics of the asphaltic material produced during the flashing of unvaporized residue from a cracking operation may be considerably improved by the incorporation or blending therewith of the tar or asphalt resulting from the washing or other suitable treatment of acid sludge. The acid sludge utilized for such blending purposes may be that obtained from the treatment with sulphuric acid of light oils including cracked distillate, or from the treatment of heavy oils such as lubricating oils, although I prefer the sludge from the treatment of the lighter oils. The acid sludge is washed with water, causing a hydrolysis of the same, or it may be treated with steam under pressure or in any manner which causes a breaking down of the acidic components, leaving an oily tar-like or pitch-like residue. The acid sludge oil or tar may be further treated by neutralizing the same with alkalies or in any manner which will serve to remove the acidic materials therefrom. During the treatment of the acid sludge, the aqueous layer separates from the oil or pitch-like layer and is withdrawn. Preferably the pitch or oily layer is dried but this operation is not absolutely necessary at this stage.

The acid tar may be reduced in a still with fire and steam, with the resulting production of a high grade of asphalt. It may be then further treated, if it is desired to raise the melting point of the product, by blowing the same hot with air.

In the preferred form of my invention the acid sludge, treated as above described to the point where the tar resulting from the treatment of the sludge has been neutralized, is mixed or blended with the flashed asphaltic residue resulting from a suitable cracking operation, in any suitable proportion depending upon the kind and quality of asphalt desired. The blended mixture is then reduced with steam, air, or both, to the desired properties.

For paving asphalts, however, and high ductility relative to peneration, simple steam reduction upon the mixture has all that is required. For roofing asphalts and for pitches utilized in the manufacture of batteries, battery boxes, rubber compounds and other purposes, it is desirable to reduce the mixture of flash residue and acid sludge residue both by steam and by blowing with air. The latter operation causes an oxidation which decreases the penetration at a more rapid rate than the ductility. The presence of a neutralized acid sludge tar in the mixture makes the product more amenable to oxidation, requiring less time for blowing and somewhat lower temperature.

As an illustrative example of the type of products obtained by the process of my invention, a mixture consisting of 50% of residue obtained from the flashing system of a cracking process having less than 4.0° A. P. I. gravity and a viscosity of approximately 700 to over 2000 seconds Furol Saybolt at 210 degrees F. was mixed with approximately 50% of washed and neutralized oil residue from the sludge acid obtained from the treatment of cracked distillates. The mixture was placed in a still and was reduced with steam to a product meeting all of the standard specifications of a paving asphalt with regard to penetration, ductility, melting point, and others. By blowing the mixture with air, and introducing some steam at the same time, the mixture was reduced to a character meeting the required specifications for roofing and other asphalts of the harder varieties. Various other mixtures, for example, 75% of flash residue, and 25% of substantially neutral sludge acid oil residue, have been used with good results. The relative proportions of the flash residue and the sludge acid oil residue will depend upon the products desired, and in general my invention comprises mixing these two components in any proportions, the concept of the invention residing in the production of asphalt from these components rather than the proportions used therefor.

What I claim is:

1. A composition of matter comprising a mixture of asphaltic residuum formed in the flash distillation of unvaporized residue resulting from the cracking of hydrocarbon oils under conditions of elevated temperature and pressure, and neutral tar obtained from the oily layer of acid sludge, the said mixture having been reduced while hot with air to oxidize the asphalt.

2. A composition of matter comprising a mixture of asphaltic residuum formed in the flash distillation of unvaporized residue resulting from the cracking of hydrocarbon oils under conditions of elevated temperature and pressure, and neutral tar obtained from the oily layer of acid sludge, the said mixture having been reduced while hot with steam and air to oxidize the asphalt.

3. A process for the production of asphaltic materials having a high ductility which comprises blending asphaltic residuum resulting from the flash distillation of unvaporized residue which is formed during the cracking of hydrocarbon oils under conditions of elevated temperature and pressure, with neutral tar obtained from the oily layer of acid sludge, and reducing the blended mixture while hot with air to oxidize the asphalt.

4. A process for the production of asphaltic materials having a high ductility which comprises blending asphaltic residuum resulting from the flash distillation of unvaporized residue which is formed during the cracking of hydrocarbon oils under conditions of elevated temperature and pressure, with neutral tar obtained from the oily layer of acid sludge, and reducing the blended mixture while hot with steam and air to oxidize the asphalt.

FELIX J. SKOWRONSKI.